(12) United States Patent
　　Hooss et al.

(10) Patent No.: US 12,607,248 B1
(45) Date of Patent: Apr. 21, 2026

(54) ROTATIONAL INDICATOR WITH MECHANICALLY ADJUSTABLE REDUCTION FACTOR

(71) Applicant: Flowserve Pte. Ltd., Singapore (SG)

(72) Inventors: William C. Hooss, Rustburg, VA (US); Daniel J. Morris, Forest, VA (US)

(73) Assignee: Flowserve Pte. Ltd., Singapore (SG)

( * ) Notice: Subject to any disclaimer, the term of this patent is extended or adjusted under 35 U.S.C. 154(b) by 0 days.

(21) Appl. No.: 19/089,202

(22) Filed: Mar. 25, 2025

(51) Int. Cl.
　　　*F16H 3/22*　　　(2006.01)
　　　*F16K 31/04*　　　(2006.01)
　　　*F16K 37/00*　　　(2006.01)
　　　*F16H 37/10*　　　(2006.01)

(52) U.S. Cl.
　　　CPC ............ *F16H 3/22* (2013.01); *F16K 31/043* (2013.01); *F16K 37/0008* (2013.01); *F16K 37/0041* (2013.01); *F16H 2037/105* (2013.01)

(58) Field of Classification Search
　　　CPC ............... F16K 31/043; F16K 37/0008; F16K 37/0041; F16H 3/30; F16H 3/32; F16H 2037/105
　　　See application file for complete search history.

(56) References Cited

U.S. PATENT DOCUMENTS

| | | | |
|---|---|---|---|
| 10,962,141 B2 * | 3/2021 | Morris | ................ F16K 37/0041 |
| 2023/0258279 A1 * | 8/2023 | Hestetun | ............. F16K 37/0041 |
| | | | 137/15.18 |

FOREIGN PATENT DOCUMENTS

| | | | | |
|---|---|---|---|---|
| DE | 102023119261 A1 * | 1/2025 | .......... | B60H 1/3421 |
| EP | 3473888 A1 * | 4/2019 | .......... | F16K 31/535 |
| KR | 101813149 B1 * | 12/2017 | ............. | F16K 31/04 |
| KR | 102616185 B1 * | 12/2023 | .......... | F16K 31/046 |

* cited by examiner

*Primary Examiner* — Bobby Rushing, Jr.
(74) *Attorney, Agent, or Firm* — Maine Cernota & Curran

(57) ABSTRACT

A rotational indicator comprises a mechanical reducer having a reduction factor that is variable without exchanging components. A plurality of identical double gears rotate about a pair of parallel fixed shafts, a large gear of each double gear being intermeshed with a small gear of a preceding double gear on the opposing shaft. An axially moveable pinion gear is rotationally fixed to a rotatable pinion shaft, and is engageable with any of the large gears of the double gears according to its axial location, whereby a reduction factor between a rotational input and the pinion gear is variable. The pinion shaft is coupled to an indicating mechanism, which can be a pointer of a dial assembly and/or a rotary electrical component. The rotational input can be bounded, and the reduction factor can be adjusted to provide a bounded output range that is compatible with the indicating mechanism.

16 Claims, 15 Drawing Sheets

ROTATIONAL INDICATOR WITH MECHANICALLY ADJUSTABLE REDUCTION FACTOR

FIELD OF THE INVENTION

The invention relates to shaft rotational position indicators, and more particularly, to gear assemblies that apply an adjustable reduction factor to the rotations of a shaft.

BACKGROUND OF THE INVENTION

There are many applications, extending over a wide range of technologies, in which a rotational indicator is required to monitor a number of rotations of a rotating input shaft, and to provide a proportionate output indication via an indicating mechanism. In general, the number of rotations may not be an integer. In some cases, the number of input rotations can be directly measured, for example by using an optical sensor to sense the passage of alternating stripes of a target that surrounds the input shaft. However, this approach generally requires an electronic counter or other control device, which may be too complex and/or costly for some applications.

In other cases, it can be desirable to mechanically apply a "reduction factor" to the input rotations using a mechanical "reducer," sometimes also referred to as a "transmission" or a "gear box," which provides a rotational output that comprises fewer output rotations, but is nevertheless proportional to the number of input rotations. This approach can enable a much simpler indicating mechanism to be utilized, such as a dial or simple rotated electrical component such as a potentiometer or rotary capacitor.

In some of these applications, the number of input rotations is "bounded," i.e. limited to a maximum, and the mechanical reducer is configured to provide an output that does not exceed the limits of an associated indicating mechanism. For example, if the indicating mechanism is a pointer of a gauge, and if the maximum number of input rotations is 800, the mechanical reducer can be configured to apply a reduction factor of 1000, so that the pointer is required to rotate over a range of only 80 percent of a full rotation, i.e. from zero to 288 degrees. Similarly, if the indicating mechanism is a 10-turn potentiometer, then the mechanical reducer can be configured to ensure that the number of output rotations is less then or equal to 10.

An example of a rotational input having a maximum number of rotations is a drive shaft that is used to actuate a control shaft of a rotary valve. In some applications, due to considerations such as torque and/or precision, a large number of rotations of the drive shaft may be required to rotate the valve between its open and closed configurations. For example, the drive shaft may be coupled to the control shaft by a worm gear or hypoid gear, whereby a full rotation of the drive shaft results in a control shaft rotation of only a few degrees. In such cases, it may be more accurate, or more convenient, to synchronize an indicating mechanism with the drive shaft via a mechanical reducer, rather than coupling the indicating mechanism directly to the control shaft.

A rotational indicator that implements a mechanical reducer can be a relatively simple and cost-effective approach for monitoring a rotational input. However, mechanical reducers tend to be inflexible, in that any change in the required reduction factor will require an exchange of mechanical components within the mechanical reducer, or outright replacement of the mechanical reducer.

What is needed, therefore, is a rotational indicator comprising a mechanical reducer that applies a reduction factor to a rotational input, where the reduction factor can be adjusted without exchanging any components of the mechanical reducer.

SUMMARY OF THE INVENTION

The present invention is a rotational indicator comprising a mechanical reducer that applies a reduction factor to a rotational input, where the reduction factor can be adjusted without exchanging any components of the mechanical reducer.

The disclosed mechanical reducer comprises a pair of compound gears, each of which comprises a plurality of identical double gears that rotate independently about a common, fixed shaft. Each of the double gears comprises a "larger" gear and a "smaller" gear, where the larger gear comprises a first plurality of gear teeth L having a respectively larger diameter, and the smaller gear comprises a second plurality of gear teeth S having a respectively smaller diameter, where L/S is defined as the double gear reduction ratio. The gear teeth of the larger and smaller gears are configured such that when two of the identical double gears are axially and radially offset and intermeshed with each other, the teeth of the larger gear of one of the two double gears can engage with the teeth of the smaller gear of the other of the two double gears.

The two compound gears are mounted next to each other in parallel and with the double gears axially offset from each other, such that successive double gears of the two compound gears are intermeshed with each other. The double gears of the two compound gears thereby function collectively as a chain of N successive double gears Gi, beginning with a first double gear G1 and ending with a last double gear Gn of the chain. With the exception of G1, the large gear of each of the double gears Gi is driven by the small gear of a preceding double gear Gi−1.

For each of the double gears, the aggregate mechanical reduction R as compared to the first double gear in the chain is equal to the product of the reduction ratios L/S of all of the double gears that precede it. And because the double gears are all identical, and all have the same double gear reduction ratio L/S, the mechanical reduction R of any of the double gears, as compared to the first double gear in the chain, can be calculated by raising the double gear reduction ratio L/S to an exponential power equal to the number of preceding double gears. For example, for a chain of at least five double gears, the mechanical reduction of the fifth double gear in the chain, as compared to the first double gear in the chain, will be equal to L/S raised to the fourth power.

In addition to the two compound gears, the mechanical reducer comprises a pinon gear that is rotationally fixed to a rotatable pinion shaft, but is axially slidable along the pinion shaft. The pinion shaft is parallel to the fixed shafts of the two compound gears, and is positioned such that the pinion gear can mesh with any of the larger gears of the double gears of either of the compound gears, depending on where the pinion gear is positioned axially along the pinion shaft. The rotational input to the mechanical reducer is applied to the first of the double gears G1 in the compound double gear chain, while the pinion shaft is the rotational output of the mechanical reducer, and is coupled to a rotational "indicating mechanism" of the rotational indicator.

A pinion gear factor P applies to rotation of the pinion gear, according to the relative number of teeth in the pinion gear as compared to the larger gears of the double gears. Accordingly, the reduction factor Ri of the mechanical reducer is equal to the pinion gear factor P multiplied by the double gear reduction ratio L/S raised to an exponential power that is equal to the number i–1 of double gears in the chain that precede the double gear Gi with which pinion gear is engaged. For example, if the pinion gear is positioned along the pinion shaft such that it engages with the fifth double gear in the chain, then the reduction factor of the mechanical reducer as a whole will be $P(L/S)^4$.

Embodiments comprise a detent mechanism that enables the pinion gear to be easily moved between the double gears, while maintaining the pinion gear in a desired axial position once it has been established. In some embodiments, in addition to the gears of the mechanical reducer, the rotational indicator comprises one or more input and/or output gears, which further influence the overall reduction factor of the rotational indicator.

In embodiments, the indicating mechanism comprises a mechanical pointer that provides a visual indication of the total number of rotations of the input shaft. The pointer can be directly mounted to the pinion shaft, or indirectly coupled to the pinion shaft by one or more output gears. In some of these embodiments, the rotational position of the pointer relative to the pinion shaft is adjustable. In various embodiments, "start" and "end" position indicators can be adjusted relative to the pointer to indicate the rotational limits of the input shaft, corresponding for example to the fully open and fully closed positions of a rotary valve.

In embodiments, the indicating mechanism comprises an electronic component, such as a single turn rotary attenuator or capacitor, coupled to output electronics that can be calibrated to translate input from the electronic output device into a rotational indication such as a position of the control shaft of a rotary valve. Various embodiments comprise both a mechanical pointer and an electronic component.

Accordingly, the reduction factor of the mechanical reducer that is incorporated into the disclosed rotational indicator can be varied over a wide range that is limited only by the double gear reduction ratio and the total number of double gears included in the compound gears. When monitoring the rotational status of a bounded rotational input using a single-turn dial or electrical component, it is only necessary to select an axial position of the pinion gear that will cause the pinion shaft to rotate through an angle of less than 360 degrees as the rotational input is rotated between its rotational limits, and then to mark and/or otherwise calibrate the indicating mechanism of the rotational indicator accordingly.

A first general aspect of the present invention is a rotational indicator comprising a mechanical reducer. The mechanical reducer comprises first and second fixed shafts, the first and second fixed shafts being parallel and proximate to each other, one of the first and second fixed shafts being configured to accept a mechanical reducer rotational input, and first and second pluralities of double gears, wherein the first plurality of double gears rotatably surround the first fixed shaft and are arranged in successive axial alignment therewith, the second plurality of double gears rotatably surround the second fixed shaft and are arranged in successive axial alignment therewith.

Each of the double gears comprises a larger gear and a smaller gear, the smaller gear being smaller in diameter than the larger gear, wherein the larger gear axially precedes the smaller gear along the first or second fixed shaft, the larger and smaller gears being rotationally coaxial with and fixed to each other. All of the larger gears are mutually identical to each other, and all of the smaller gears are mutually identical to each other, a double gear reduction factor being equal to a number of teeth included in each of the larger gears divided by a number of teeth included in each of the smaller gears.

The larger and smaller gears are configured such that the larger gear of any one of the double gears can be intermeshed with the smaller gear of any of the other double gears when brought into axially aligned proximity thereto, and the fixed shafts and double gears are arranged such that, except for a last of the double gears, the smaller gear of each of the double gears surrounding the first fixed shaft is intermeshed with the larger gear of a next one of the double gears surrounding the second fixed shaft, and vice versa.

The rotational indicator further comprises an axially rotatable pinion shaft proximate, and axially parallel with, the first and second fixed shafts, and a pinion gear rotationally fixed to the pinion shaft, the pinion gear being axially translatable along the pinion shaft such that it can be engaged with any selected one of the larger gears of the double gears.

And the rotational indicator further comprises an indicating mechanism rotationally coupled to the pinion shaft and configured to provide a rotational indication according to a reduction factor applied to a rotational input of the rotational indicator.

In embodiments, all of the double gears are identical to each other.

Any of the above embodiments can further include tension springs interspersed with the double gears on each of the first and second fixed shafts, the tension springs being configured to maintain axial positions of the double gears surrounding the first and second fixed shafts.

Any of the above embodiments can further include a detent mechanism configured to apply a retaining force to the pinion gear that tends to maintain an axial positioning of the pinion gear in engagement with any one of the larger gears of the double gears, while allowing the pinion gear to be transitioned between the larger gears of the double gears by application of an axial force to the pinion gear that is sufficient to overcome the retaining force.

In any of the above embodiments, the rotational input to the rotational position indicator can be rotationally coupled to the rotational input of the mechanical reducer via at least one input gear.

In any of the above embodiments, the pinion shaft can be rotationally coupled to the output mechanism via at least one output gear.

In any of the above embodiments, the output mechanism can include a mechanical output configured to provide a visual rotational position indication. In some of these embodiments, the mechanical output comprises a pointer configured to rotate in synchronization with the pinion shaft. Some of these embodiments further include a pointer scale proximate the pointer, the pointer scale comprising relatively rotatable indicating plates which, in combination, provide an indication of rotational limits between which the pointer is able to rotate. And some of these embodiments further include an intermediate plate sandwiched between the indicating plates and configured to limit a range of relative rotational adjustment of the indicating plates.

In any of the above embodiments, the output mechanism can include an electronic output configured to provide an electronic rotational position indication, said electronic output comprising a rotary electronic component that is rotationally synchronized with the pinion shaft. In some of these embodiments, the rotary electronic component is a single turn rotary potentiometer or a single turn variable capacitor.

In any of the above embodiments, the rotational position indicator can be configured to indicate a relative degree of opening of a rotary valve.

A second general aspect of the present invention is a method of providing a rotational indication of less than 360 degrees representing a number of rotations of an input shaft. The method includes providing a rotational indicator according to any embodiment of the first general aspect, coupling the input shaft to the rotational input of the rotational indicator, axially translating the pinion gear along the pinion shaft into engagement with a designated one of the double gears, the designated double gear being selected such that rotation of the rotational input shaft up to a maximum number of rotations will result in a rotation of the indicating mechanism of less than 360 degrees, and calibrating the indicating mechanism of the rotational indicator such that the indicating mechanism is configured to indicate a rotational state of the input shaft.

In embodiments, the indicating mechanism comprises a dial assembly, and calibrating the indicating mechanism comprises aligning limit indicators of the dial assembly with minimum and maximum directions of the pointer that correspond respectively with zero rotations and with the maximum number of rotations of the input shaft.

In embodiments, the indicating mechanism comprises a rotatable potentiometer or variable capacitor, and calibrating the indicating mechanism comprises calibrating a conversion of measured resistance or capacitance of the indicating mechanism to indicate the rotational state of the input shaft.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a rotational indicator comprising a mechanical reducer that applies a reduction factor to a rotational input, where the reduction factor can be adjusted without exchanging any components of the mechanical reducer.

Figure 1A:
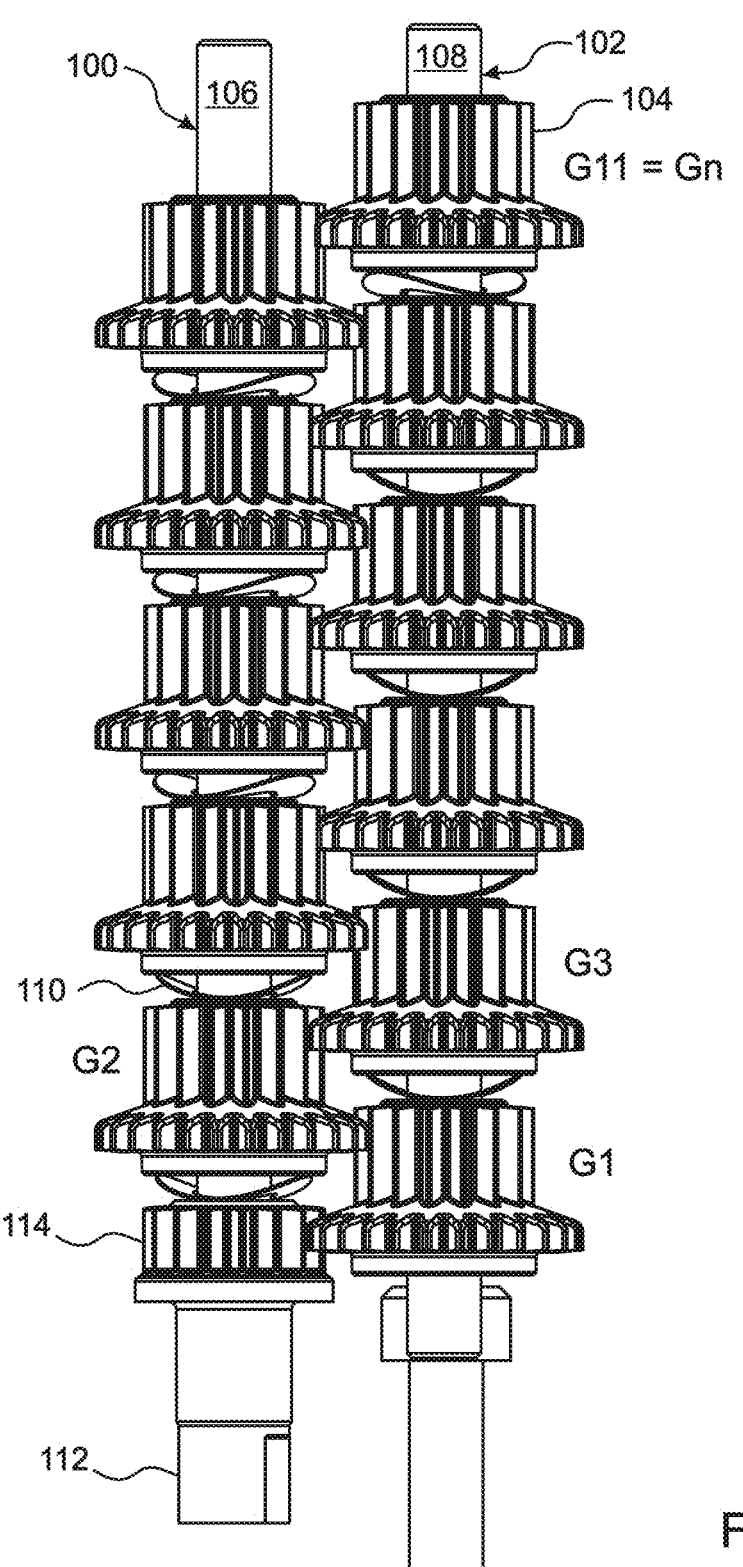
FIG. 1A is front view, drawn to scale, of a pair of intermeshed compound gears according to an embodiment of the present invention.

With reference to FIG. 1A, the disclosed mechanical reducer comprises a pair of compound gears 100, 102, each of which comprises a plurality of double gears 104 that rotate independently about a common, fixed shaft 106, 108. In the illustrated embodiment, the double gears 104 are separated from each other along the fixed shafts 106, 108 by leaf springs 110 which maintain a tension between the double gears 104, thereby maintaining their axial positioning, while allowing the double gears 104 to freely rotate about their shafts 106, 108. In the embodiment of FIG. 1A the rotational input to the compound gears 100, 102 is via an input shaft 112 that is coupled to the first (lowest, right side) of the double gears 104 by an input gear 114.

Figures 1B, 1C:
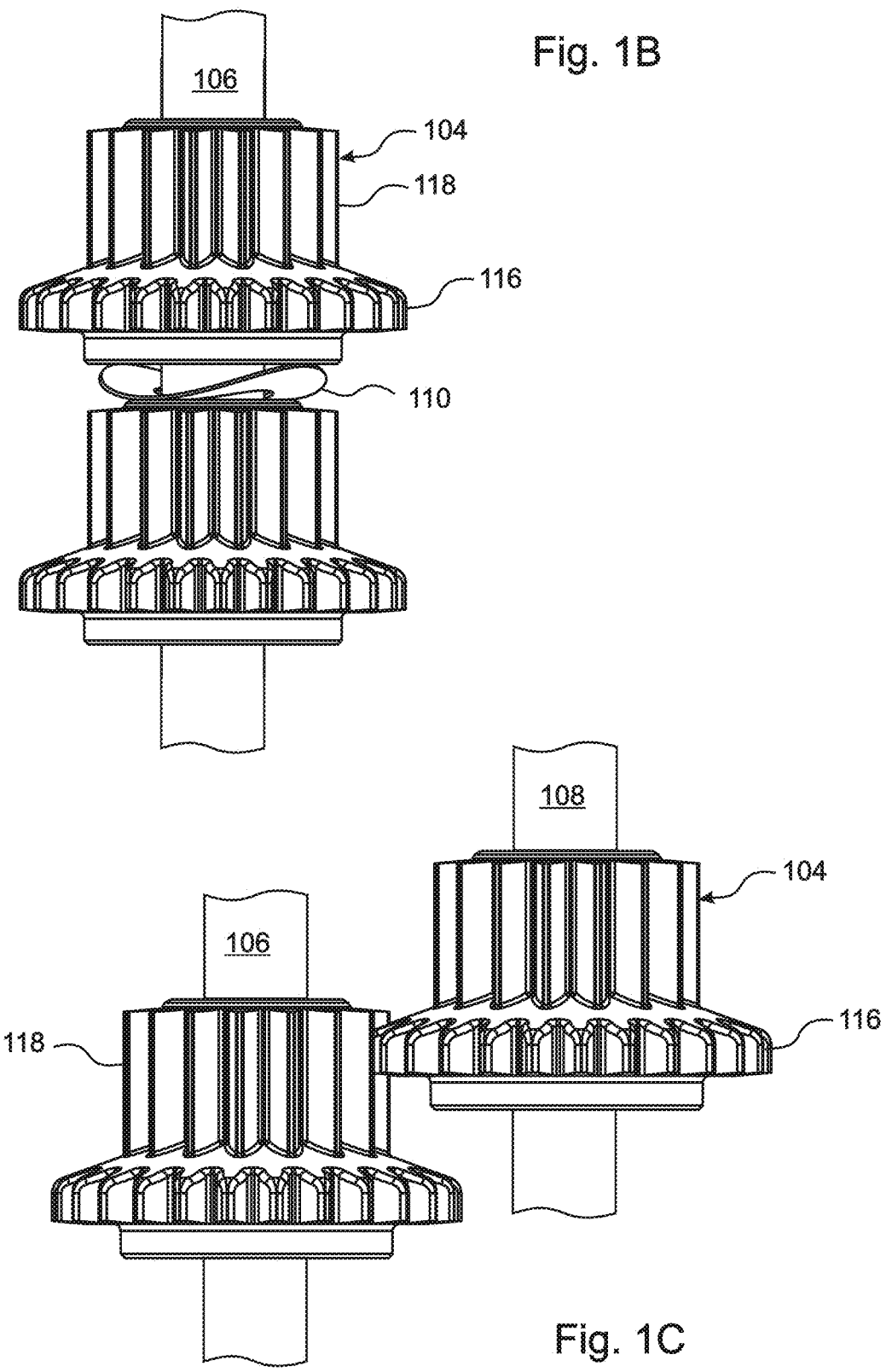
FIG. 1B is a closeup side view, drawn to scale, of two successive double gears included on the same fixed shaft.
FIG. 1C is a closeup side view, drawn to scale, of a double gear on the first fixed shaft intermeshed with a double gear on the second fixed shaft.

With reference to FIG. 1B, each of the double gears 104 comprises a "larger" gear 116 and a "smaller" gear 118. The larger gear 116 comprises a first plurality of gear teeth L having a respectively larger diameter, and the smaller gear 118 comprises a second plurality of gear teeth S having a respectively smaller diameter, where L/S is defined as the double gear reduction ratio. With reference to FIG. 1C, the gear teeth of the larger 116 and smaller 118 gears are configured such that when two of the identical double gears 104 are axially offset and intermeshed with each other, the teeth of the larger gear 116 of one of the two double gears can engage with the teeth of the smaller gear 118 of the other of the two double gears.

The large 116 and small 118 gears of the double gears are identical, thereby allowing the double gears to intermesh as shown in FIG. 1C. While it is often convenient to provide double gears that are identical to each other in all respects, some features of the double gears, such as their lengths, can vary among the double gears without exceeding the scope of the present disclosure, so long as the teeth of the large 116 and small 118 gears of all of the double gears have identical diameters and are configured to intermesh with each other.

With reference again to FIG. 1A, the two compound gears 106, 108 are mounted next to each other in parallel and with their double gears 104 axially and radially offset from each other, such that successive double gears 104 of the two compound gears 106, 108 are intermeshed with each other. The double gears 104 of the two compound gears 106, 108 thereby function collectively as a chain of n successive double gears Gi 104, beginning with a first double gear G1, which appears at the lower right of FIG. 1A as part of compound gear 108, followed by G2, which appears at the lower left of FIG. 1A as part of compound gear 100, and ending with a last double gear Gn of the chain, which appears at the upper right of FIG. 1A as part of compound gear 102. In FIG. 1A, the chain includes 11 double gears 104, such that N=11, and Gn is G11. With the exception of G1, the large gear 116 of each of the double gears Gi 104 of each of the compound gears 106, 108 is driven by the small gear 118 of a preceding double gear Gi 104 of the other compound gear. For example, the large gear 116 of G2 in FIG. 1A is driven by the small gear 118 of G1.

Figure 2A:
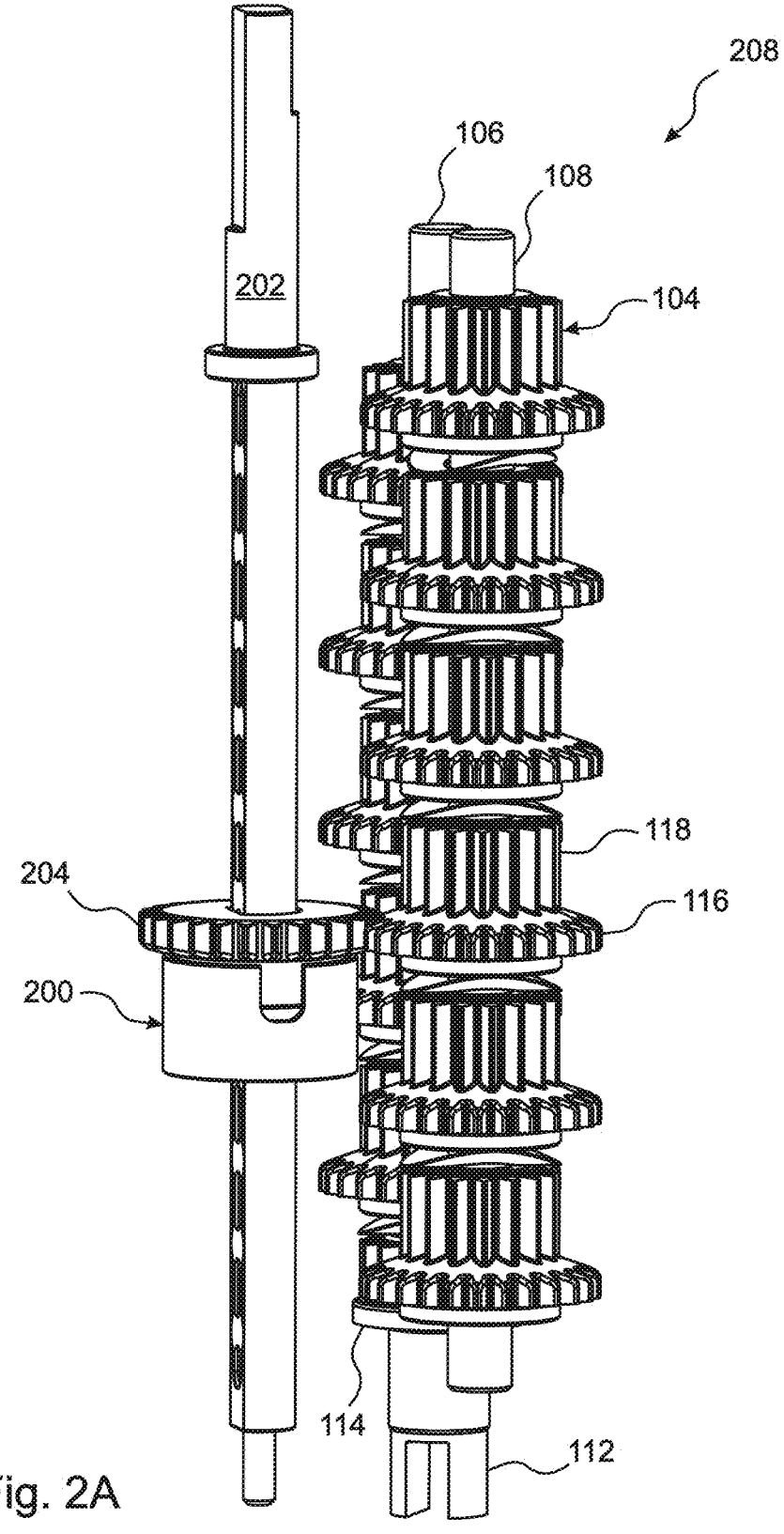
FIG. 2A is a side view, drawn to scale, of a mechanical reducer that includes the compound gears of FIG. 1A in combination with a pinion gear, according to an embodiment of the present invention.
Figure 2B:
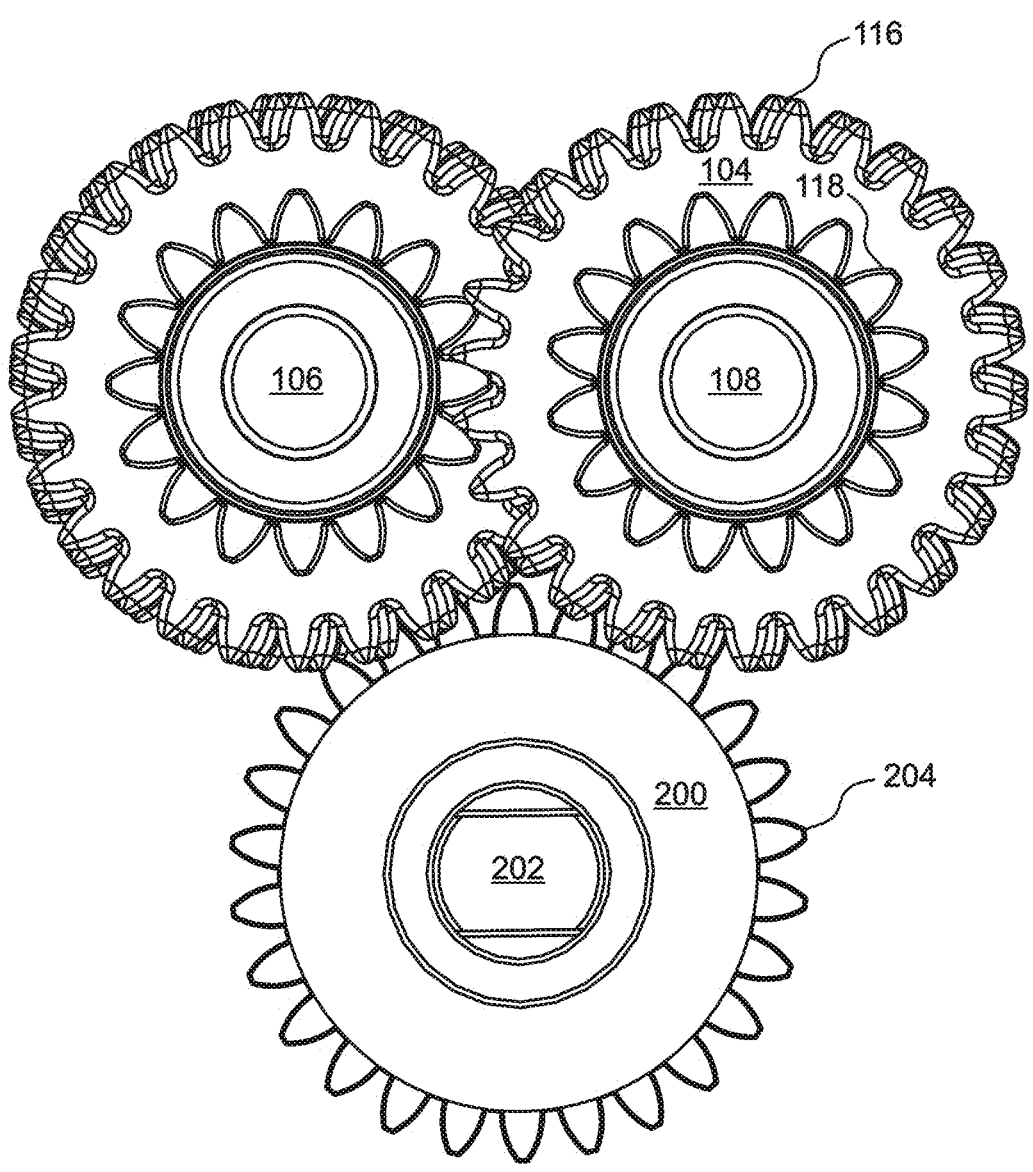
FIG. 2B is a top view, drawn to scale, of the compound gears and pinion gear of FIG. 2A.

With reference to FIG. 2A, in addition to the two compound gears 100, 102, the mechanical reducer 208 comprises a pinon gear 200 that is rotationally fixed to a rotating pinion shaft 202, but is axially slidable along the pinion shaft 202. The pinion shaft 202 is parallel to the fixed shafts 106, 108 of the two compound gears 100, 102, and, with reference to the top view of FIG. 2B, is positioned such that the teeth 204 of the pinion gear 200 can mesh with any of the larger gears 116 of the double gears 104 of either of the compound gears 100, 102, depending on where the pinion gear 200 is positioned axially along the pinion shaft 202. In the illustrated embodiment of FIG. 2B, the larger gears 116 of the double gears 104 include 26 teeth, while the smaller gears 118 include 16 teeth. Accordingly, in this example, L=26, S=16, and the double gear reduction ratio L/S is 1.625.

The pinion shaft 202 is the rotational output of the mechanical reducer 208, and is coupled to an indicating mechanism of the rotational indicator, as is discussed in more detail below. The reduction factor of the mechanical reducer 208, and thereby of the rotational indicator, is adjusted by axially positioning the pinion gear 200 to mesh with a selected one of the double gears 104.

Figures 3A, 3B:
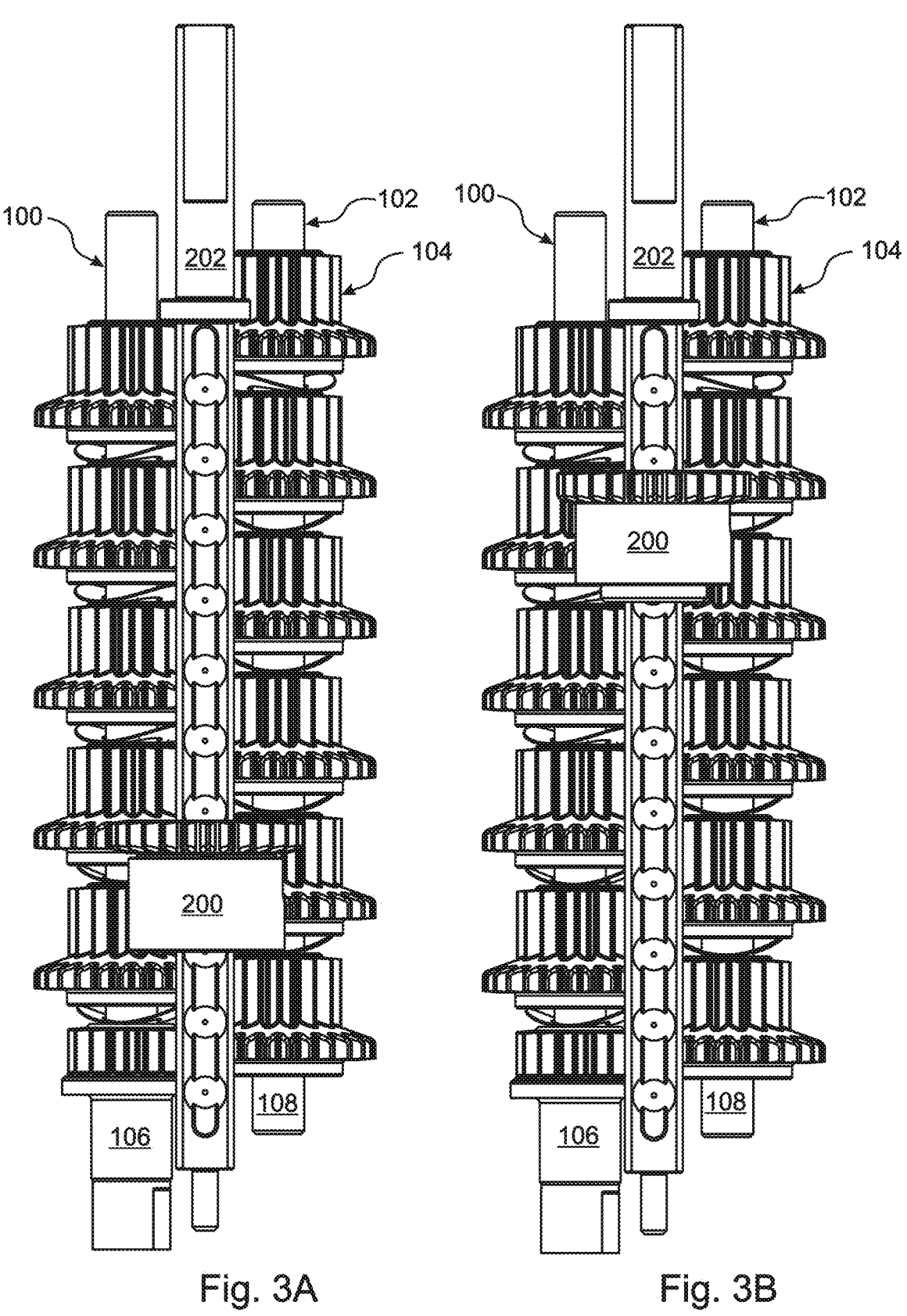
FIG. 3A is a front view, drawn to scale, of the mechanical reducer of FIG. 2A showing the pinion in a first axial position.
FIG. 3B is a front view, drawn to scale, of the mechanical reducer of FIG. 3A showing the pinion in a second axial position.

FIGS. 3A and 3B illustrate the embodiment of FIG. 2A shown with the pinion gear 200 engaged with a double gear 104 of compound gear 100 (FIG. 3A) and with a double gear 104 of compound gear 102 (FIG. 3B) respectively.

Figure 3C:
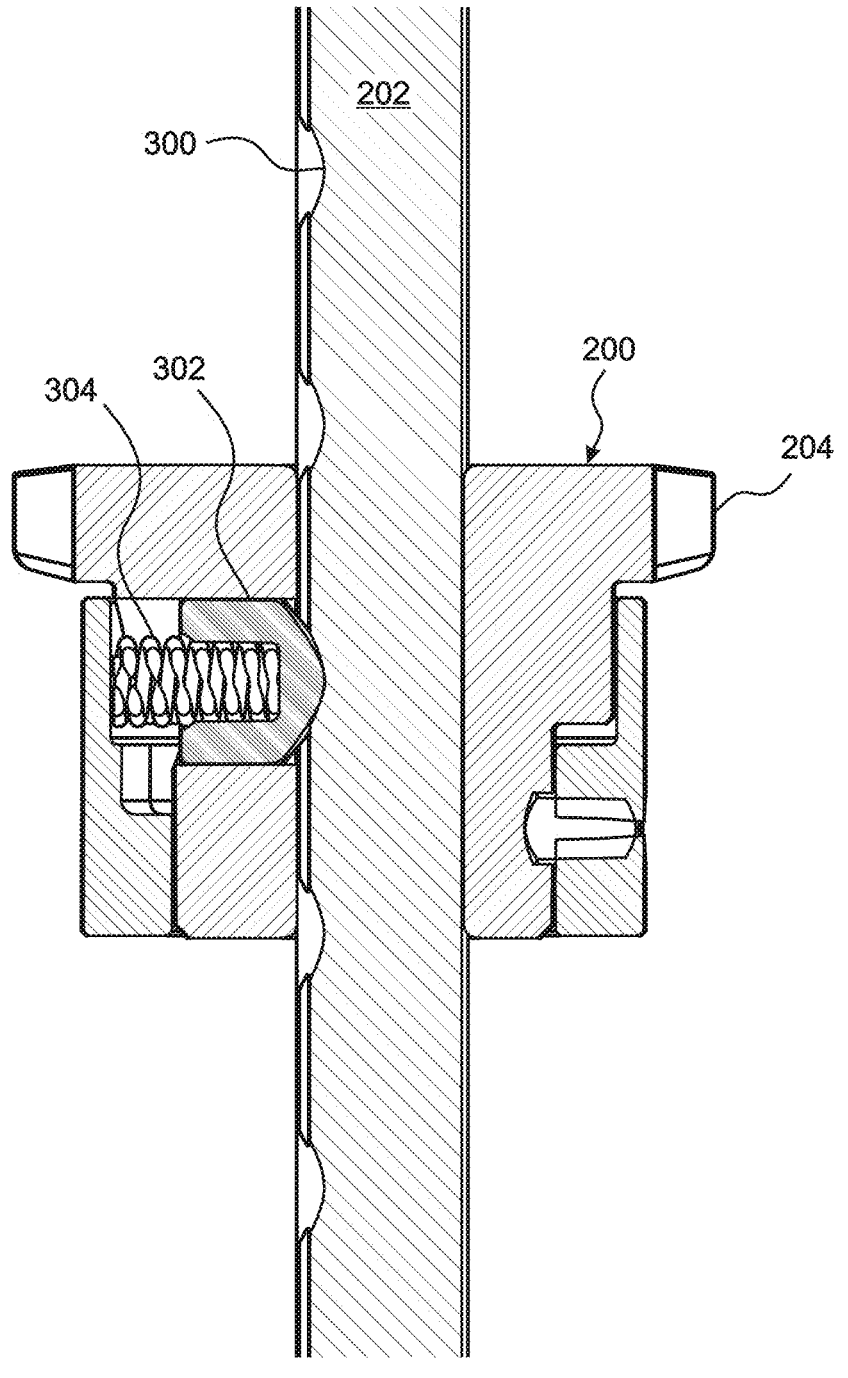
FIG. 3C is a sectional closeup side view, drawn to scale, of the pinion gear of FIG. 3A showing a detent mechanism engaged with the pinion shaft.

In various embodiments, the pinion gear can be fixed in a selected axial position by any means that is known in the art, for example by providing a set screw. With reference to FIG. 3C, embodiments comprise a detent mechanism that enables the pinion gear 200 to be easily moved along the pinion shaft 202 to engage with any selected one of the double gears 104, while maintaining the pinion gear 200 in a desired axial position once it has been established. In the sectional view of FIG. 3C, the pinion shaft 202 includes a flat side in which depressions 300 are provided that are aligned with the axial locations of the double gears 104. An engagement slug 302 is included within the pinion gear 200, and is pressed into the depressions 300 by a spring 304, thereby maintaining the axial position of the pinion gear 200 until sufficient force is applied to cause the spring 304 to be compressed.

For each of the double gears Gi 104, the aggregate mechanical reduction Ri as compared to the first double gear G1 104 is equal to the product of the reduction ratios L/S of all of the double gears 104 that precede it. And because the large gears 116 and the small gears 118 of the double gears 104 are all identical, such that all of the double gears 104 have the same double gear reduction ratio L/S, the mechanical reduction Ri of any of the double gears Gi 104, as compared to the first double gear G1 104, can be calculated by raising the double gear reduction ratio L/S to an exponential power equal to the number i−1 of preceding double gears. This relationship can be expressed as:

$$Ri=(L/S)^{i-1} \tag{1}$$

With reference again to FIGS. 2A and 2B, in the illustrated example L=26, S=16, and L/S=1.625. According to eqn. 1, the mechanical reduction R5 of the fifth double gear 104 in the chain, G5, as compared to the first double gear 104 in the chain, G1, is equal to 1.625 raised to the fourth power, which is approximately 6.97. For the final double gear 104 in the chain, which in this example is G11, the mechanical reduction R11 is equal to 1.625 raised to the 10th power, which is approximately 128.4.

In general, a pinion gear factor P applies to rotation of the pinion gear 200, according to the relative number of teeth 202 in the pinion gear as compared to the larger gears 116 of the double gears 104. Accordingly, the reduction factor of the mechanical reducer 208 as a whole is P×Ri. In the example of FIGS. 2A and 2B, the pinion gear 200 has the same number of teeth 202 as the larger gears 116 of the double gears 104, so that P=1, and the reduction factor of the mechanical reducer 208 is Ri as determined from eqn. 1. In general, however, Ri may not be the reduction factor of the rotational indicator as a whole, for example if additional reductions are introduced by input and/or output gears. For example, in FIG. 1A, the input gear 114 has 16 teeth, while the large gears 116 of the double gears 104 have 26 teeth. As a result, if the pinion gear 200 is engaged with the last double gear in the chain G11, the net reduction factor of the pinion shaft 202 will be 1.625 times R11, which is approximately 208.6.

FIG. 4 is a front view of a rotational position indicator 400 that incorporates the mechanical reducer 208 of FIG. 2A (surrounded in FIG. 4 by dashed lines). In the illustrated embodiment, the indicating mechanism is a pointer assembly 402 comprising a mechanical pointer 404 that provides a visual indication of the reduced rotational input that is being monitored by the rotational position indicator 400. In embodiments, the position of the pointer 404 indicates the rotational position of a rotary valve. The rotational input to the mechanical reducer 208 is from below via the drive gear 114, as discussed above with reference to FIG. 2B. The output of the mechanical reducer 208 is the pinion shaft 202. In FIG. 4, the pointer 404 is rotationally fixed to the pinion shaft 202, such that the overall reduction factor of the pointer 404 can be adjusted from 1.625, if the pinion gear 200 is engaged with G1, up to 208.6, if the pinion gear is engaged with G11. In similar embodiments, the pointer 404 is indirectly coupled to the pinion shaft 202 by one or more output gears (not shown) that further influence the overall reduction factor.

Figure 4A:
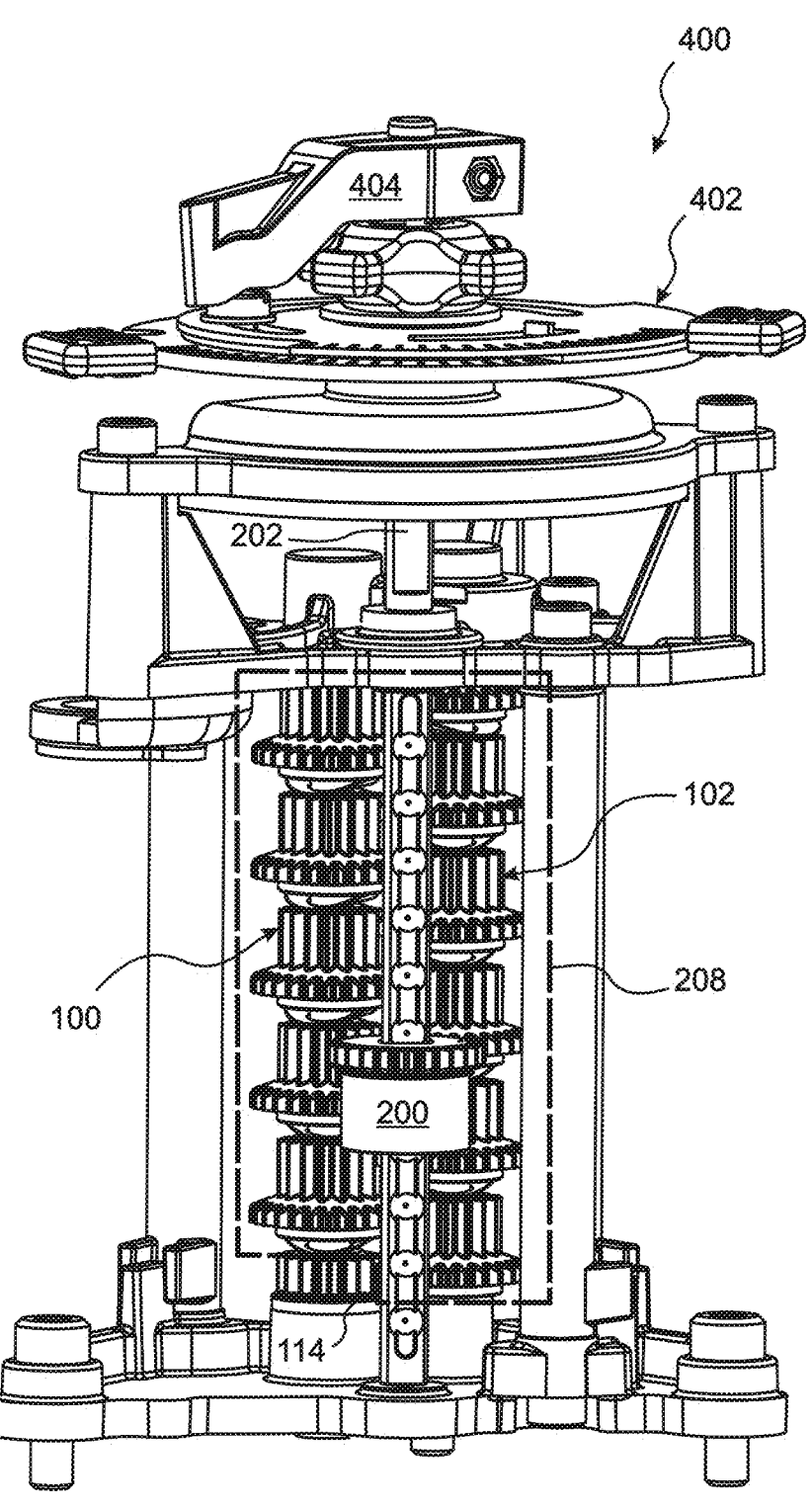
FIG. 4A is a front view, drawn to scale, of an embodiment of the present invention in which the indicating mechanism is a dial assembly.
Figure 4B:
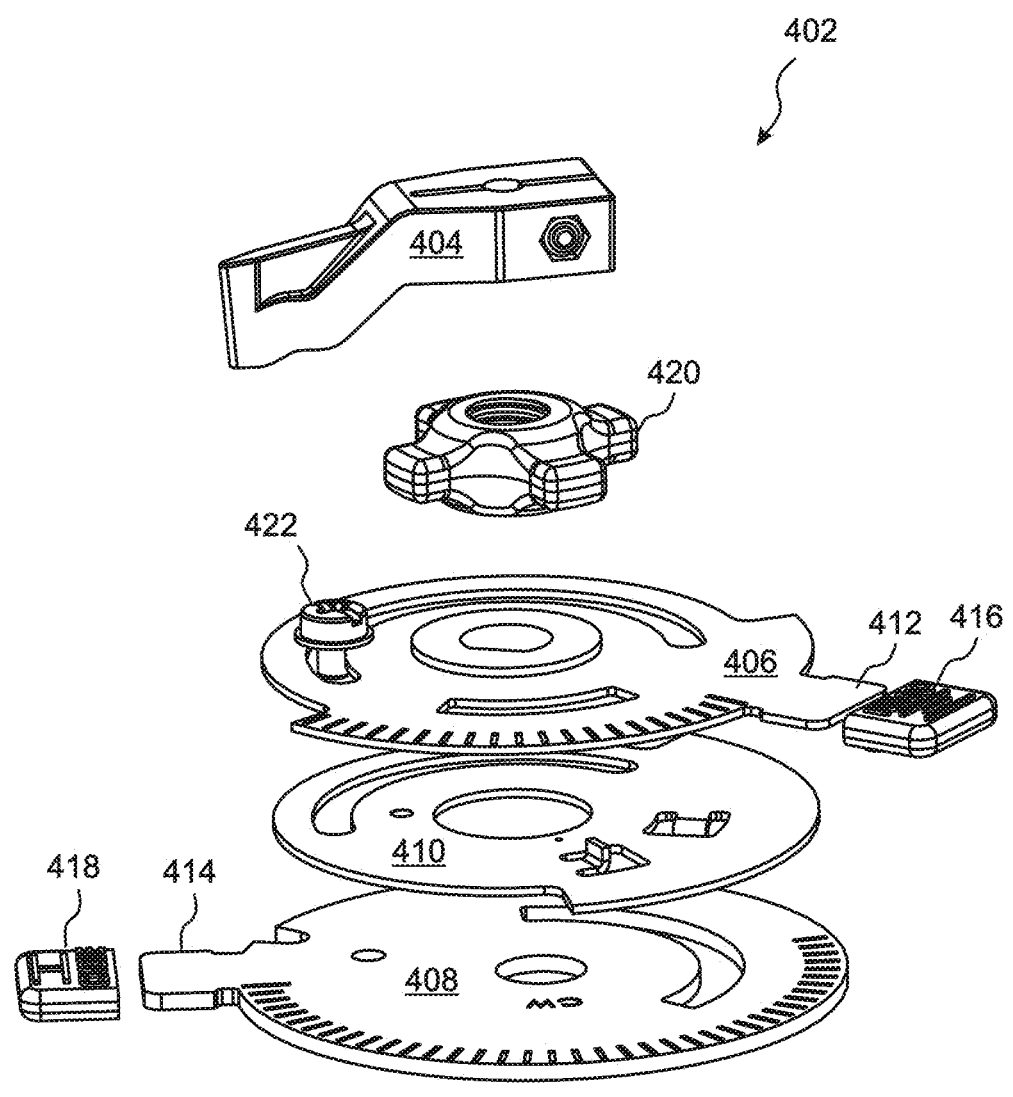
FIG. 4B is a perspective view from above, drawn to scale, of the dial assembly of FIG. 4A.
Figure 4C:
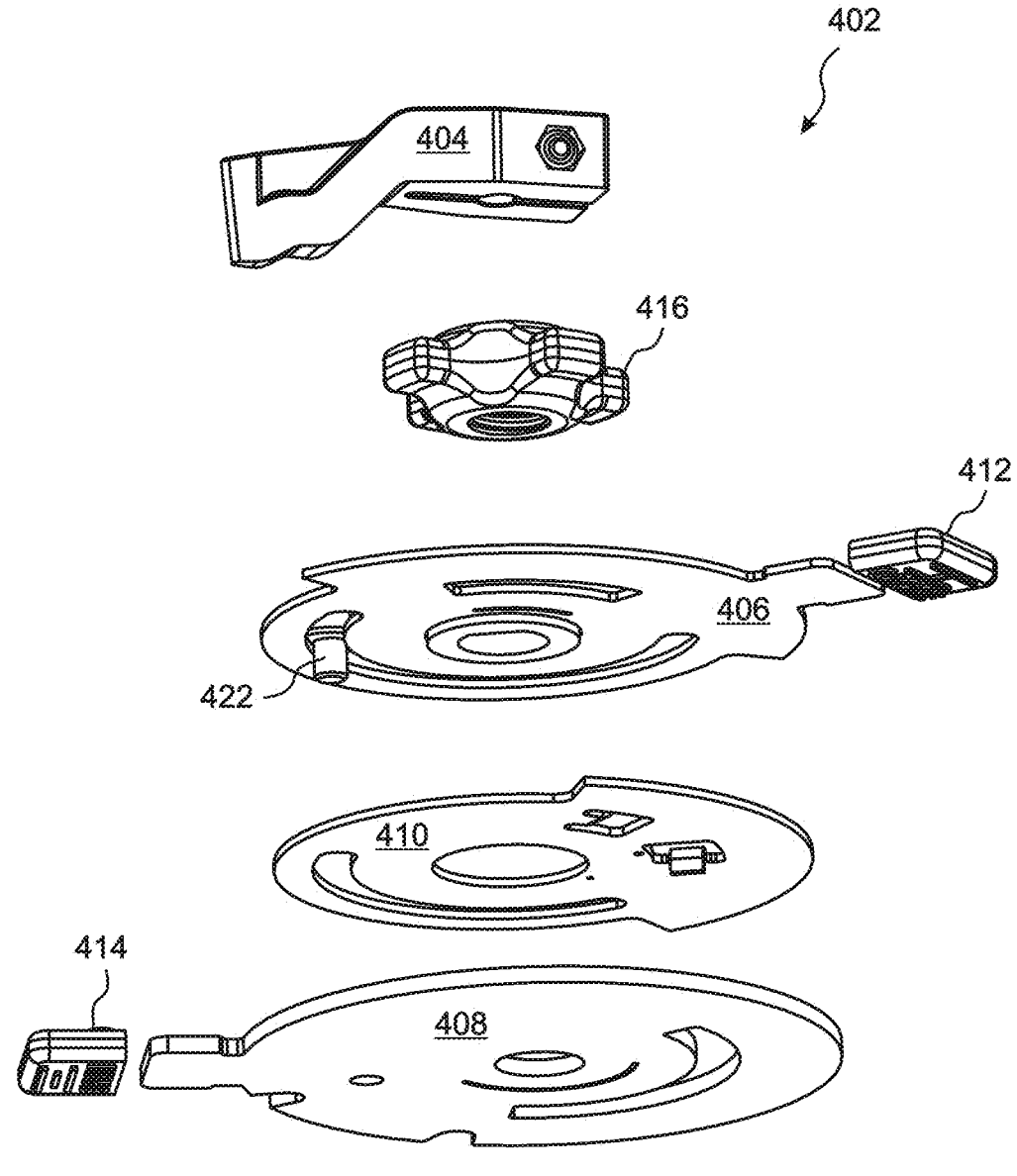
FIG. 4C is a perspective view from below, drawn to scale, of the dial assembly of FIG. 4A.

FIGS. 4B and 4C are perspective exploded views from above and below, respectively, of the dial assembly 402 of FIG. 4A. In addition to the pointer 404, the dial assembly 402 comprises range limit indicating plates 406, 408 that can be rotated relative to each other to indicate the start and end of the rotation range of the pointer 404. Each of the range limit indicating plates 406, 408 comprises a tab 412, 414 onto which a limit label 416, 418 can be mounted. The direction in which the pointer 404 rotates relative to the input shaft will depend on whether the pinion gear 200 is engaged with the first compound gear 100 or the second compound gear 102. Accordingly, changing the reduction factor of the rotational position indicator 400 by changing the axial location of the pinion gear 200 on the pinion shaft 202 can result in the pointer 404 reversing its direction of rotation. In the illustrated embodiment, the limit labels 416, 418 can be exchanged between the tabs 412, 414 according to the rotational direction of the pointer 404.

In the illustrated embodiment, an intermediate plate 410 is included between the range limit indicating plates 406, 408. The intermediate plate 410 couples to both of the range limit indicating plates 406, 408 and establishes maximum and minimum ranges that can be indicated. The assembly of plates 406, 408, 410 are held together and fixed in their orientations by a screw 422 and a nut 420 that can be loosened when adjusting and calibrating the relative orientations of the range limit indicating plates 406, 408 and their combined orientation relative to the pinion shaft 202.

Figure 4D:
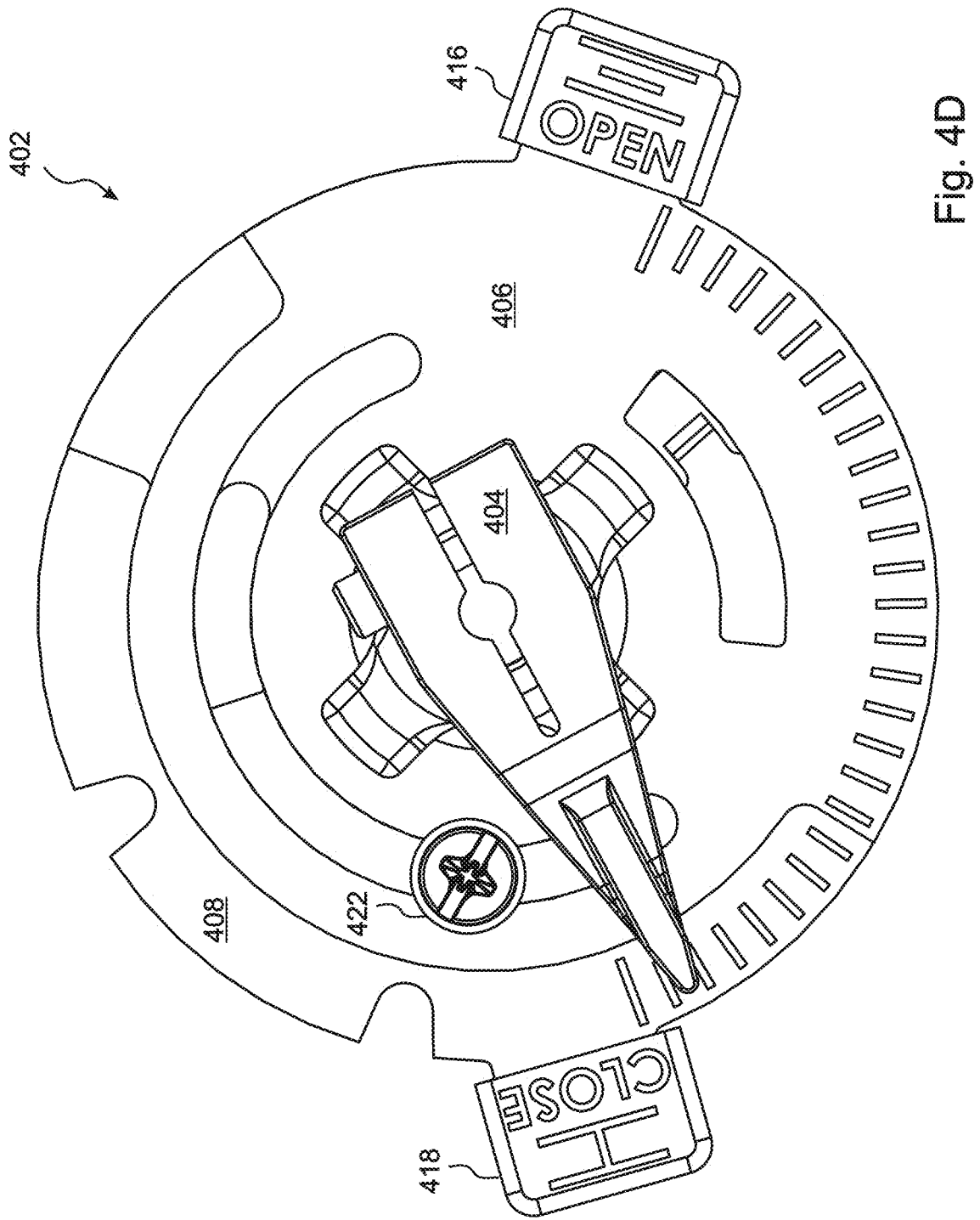
FIG. 4D is a top view, drawn to scale, of the dial assembly of FIG. 4A showing the pointer near a first rotational limit thereof.
Figure 4E:
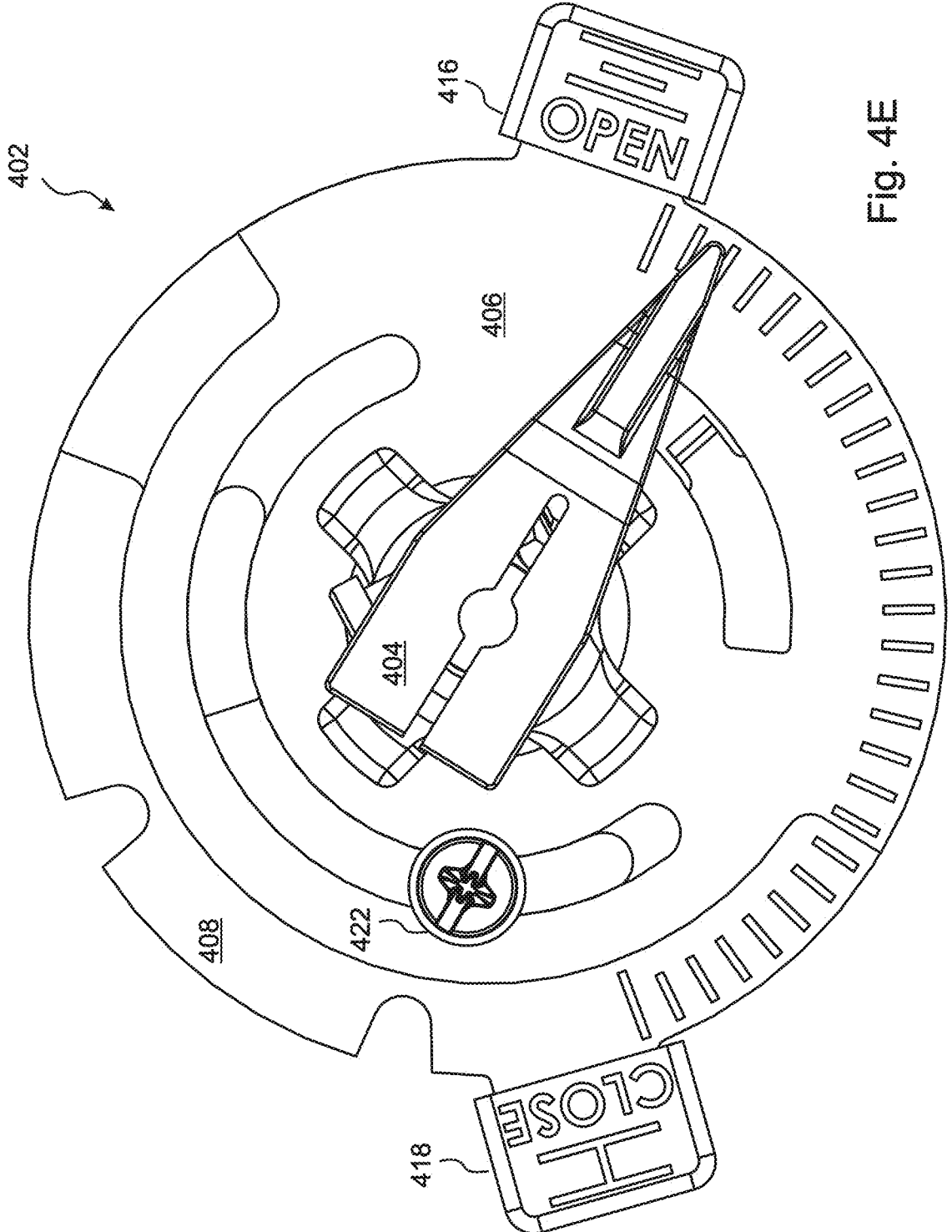
FIG. 4E is a top view, drawn to scale, of the dial assembly of FIG. 4D showing the pointer near a second rotational limit thereof.

FIGS. 4D and 4E are top views of the pointer assembly 402 of FIG. 4A showing the pointer 404 at the beginning (FIG. 4D) and end (FIG. 4E) of its rotational range. In the illustrated example, these limits indicate that a rotary valve is either fully closed or fully open.

Figure 4F:
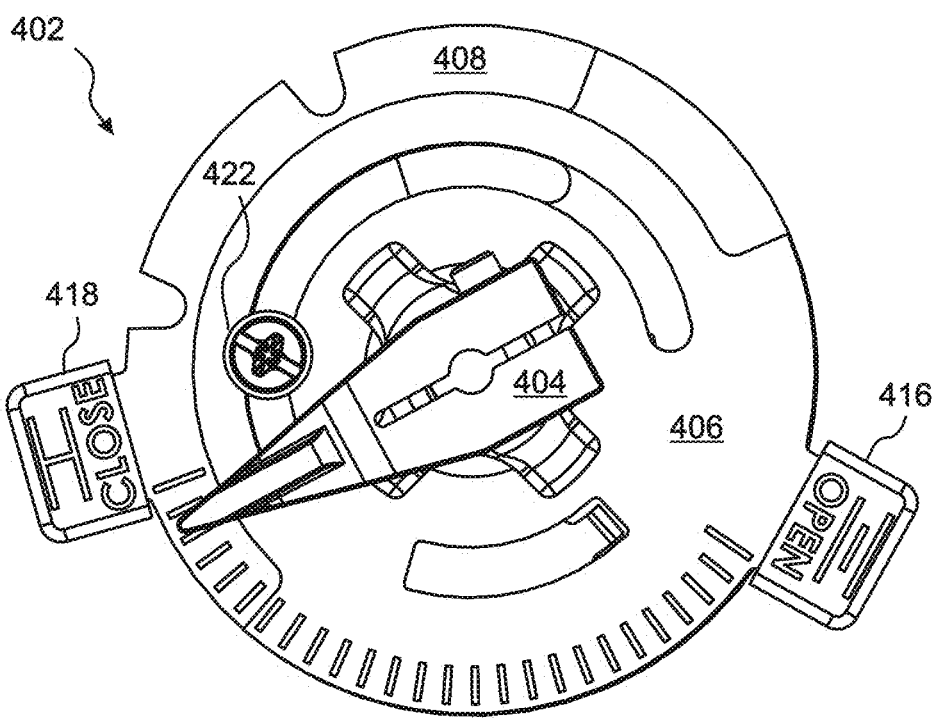
FIG. 4F is a top view, drawn to scale, of the dial assembly of FIG. 4A showing the range limit indicating plates rotated to indicate a minimum rotational range of the pointer.
Figure 4G:
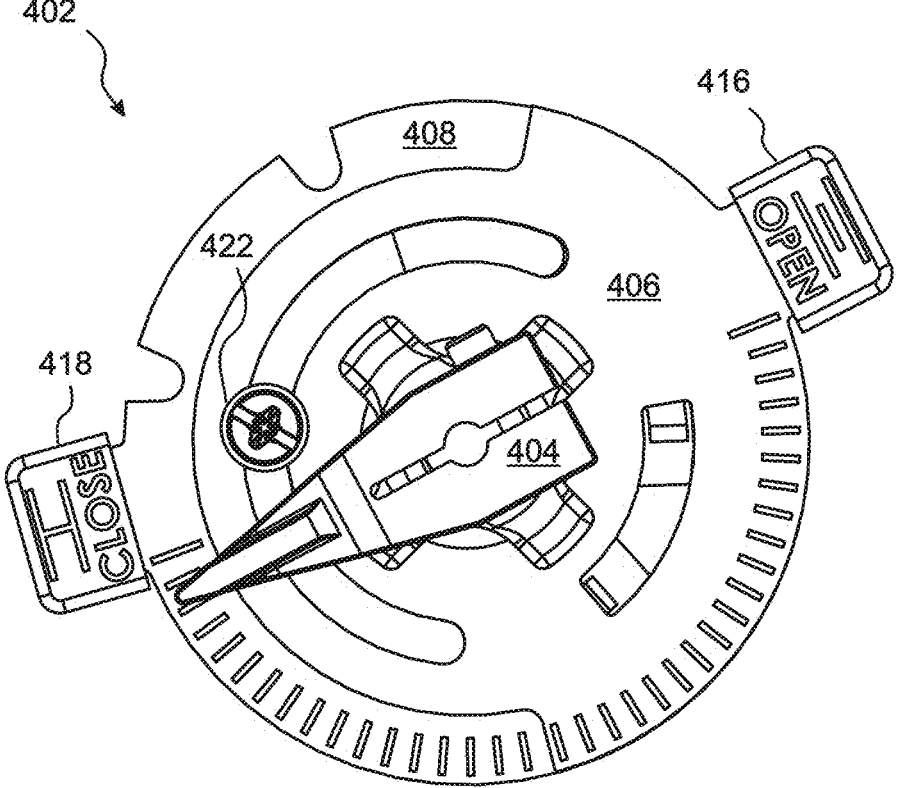
FIG. 4G is a top view, drawn to scale, of the dial assembly of FIG. 4F showing the range limit indicating plates rotated to indicate a maximum rotational range of the pointer.

FIGS. 4F and 4G illustrate adjustment of the rotation range by reorientation of the range limiting plates 406, 408 relative to each other, where FIG. 4F shows the plates adjusted to the minimum range that is allowed by intermediate plate 410, and FIG. 4G shows the plates adjusted to the maximum range that is allowed by intermediate plate 410.

Figure 5A:
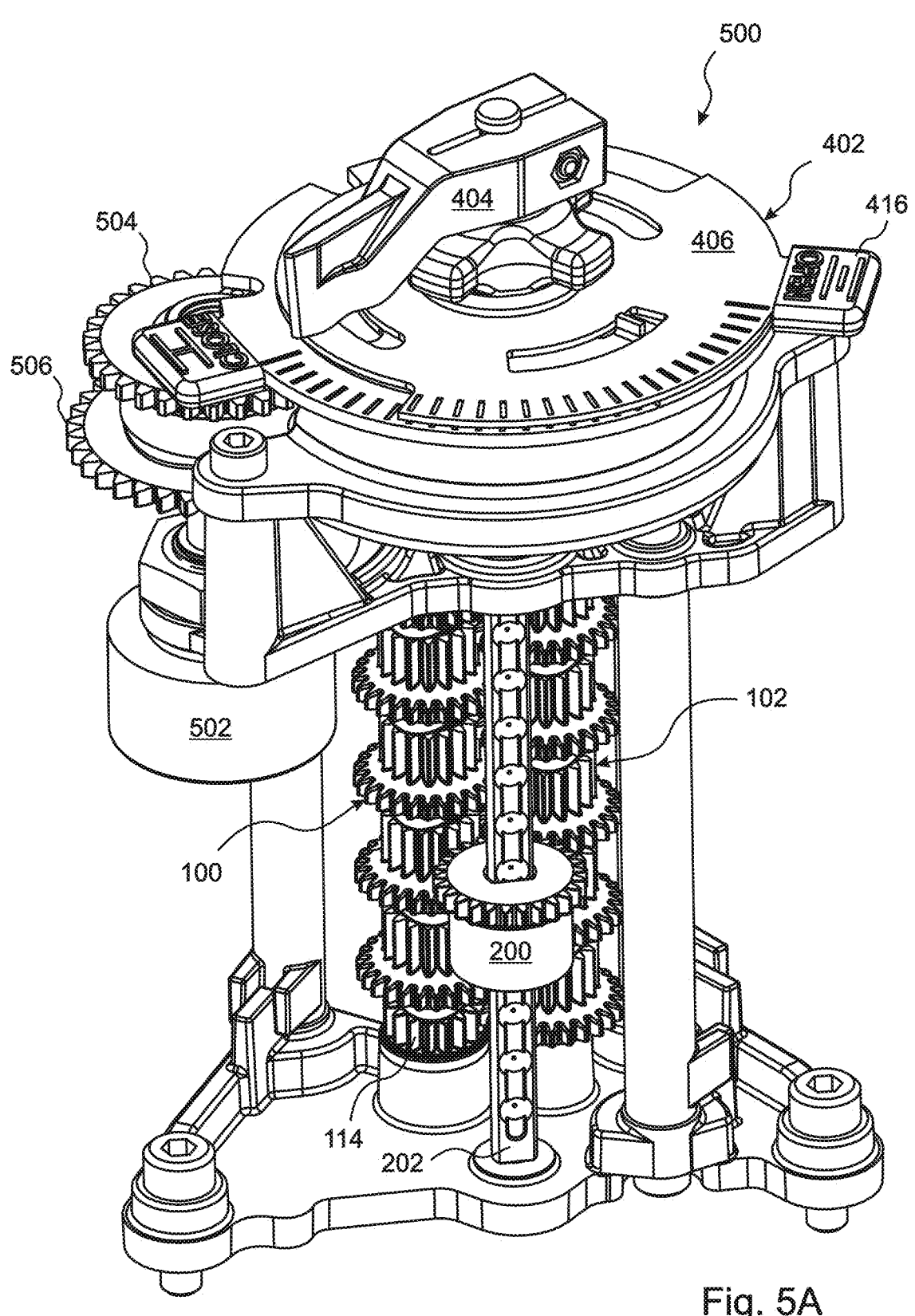
FIG. 5A is a perspective view from above, drawn to scale, of an embodiment of the present invention in which the indicating mechanism comprises both a dial assembly and a rotary electrical component.
Figure 5B:
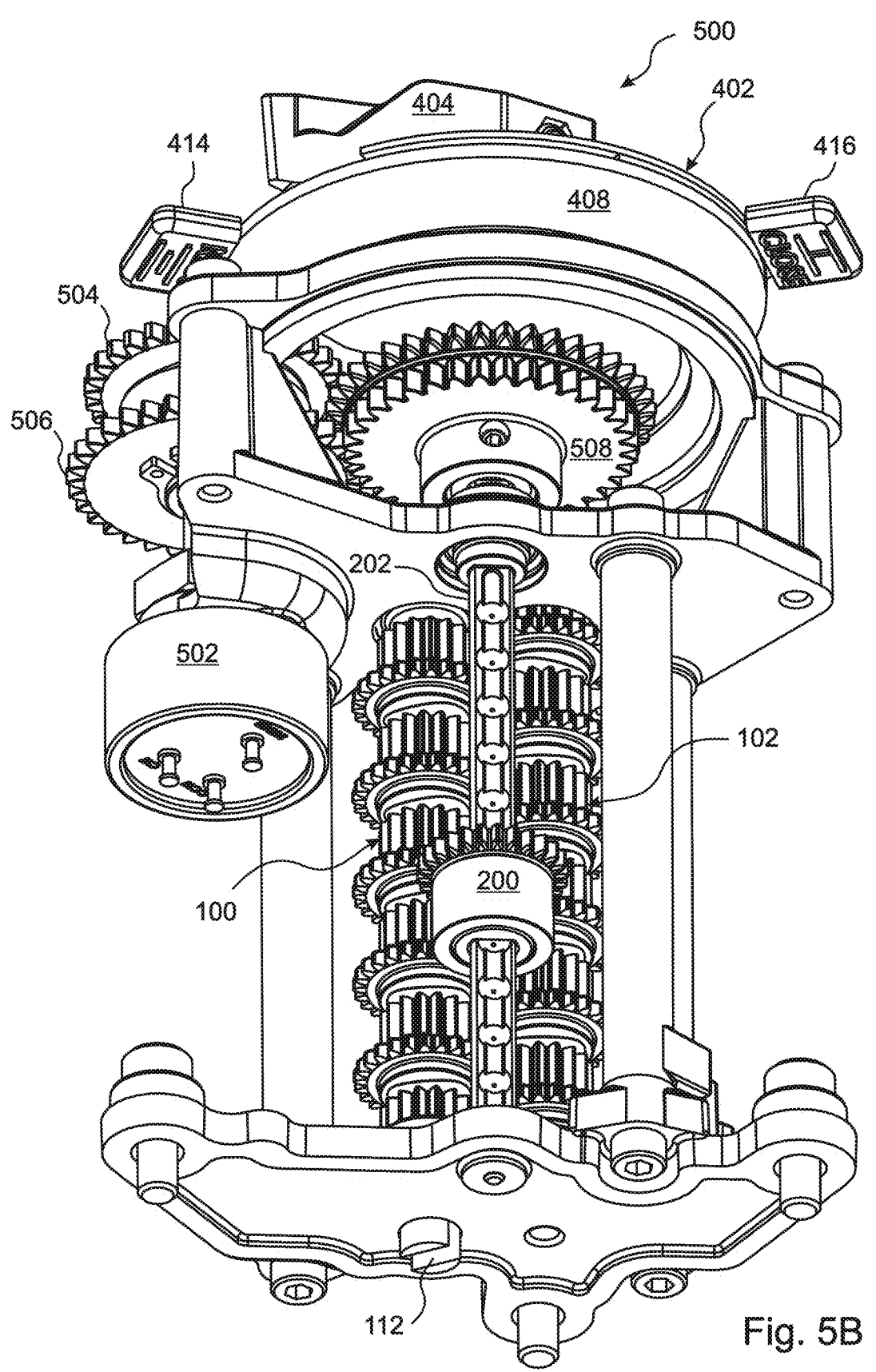
FIG. 5B is a perspective view from below, drawn to scale, of the embodiment of FIG. 5A.

FIGS. 5A and 5B are perspective view respectively from above and below of a rotational position indicator 500 in an embodiment that is similar to FIG. 4A, except that the indicating mechanism of the rotational indicator 500 further includes an electronic component, which in the illustrated embodiment is a single turn rotary potentiometer 502. Also included, but not shown, is a resistance monitor that can be calibrated to translate input from the rotary potentiometer 502 into a rotational indication such as the rotational orientation of a rotary valve. The rotary potentiometer 502 is coupled to the pinion shaft 202 by an assembly of three output gears 504, 506, 508. Gear 508 is a double gear that is rotationally fixed to the pinion shaft 202, and can be axially adjusted along the pinion shaft 202 such that it engages with either gear 504 or gear 506, both of which are rotationally fixed to the rotary attenuator 502. Accordingly, either of two output reduction factors is further applied to the rotary attenuator 502.

Figure 6:
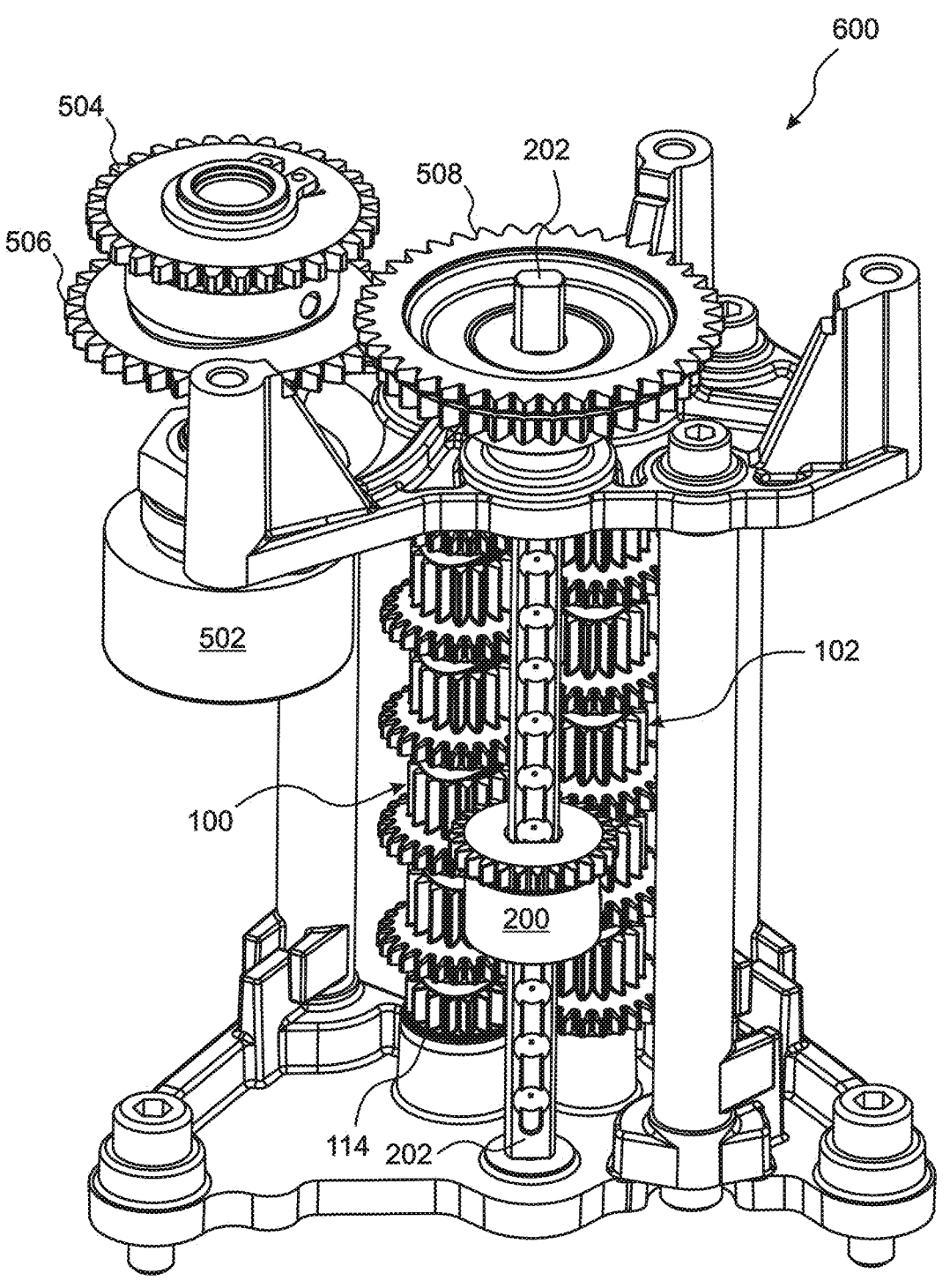
FIG. 6 is a perspective view from above, drawn to scale, of an embodiment of the present invention in which the indicating mechanism comprises only a rotary electrical component.

FIG. 6 is a perspective view from above of an embodiment 600 of the present invention that is similar to FIGS. 5A and 5B, except that the indicating mechanism includes only an electronic component 502, which in the illustrated example is the rotary potentiometer 502.

In summary, the reduction factor of the disclosed mechanical reducer, and hence of the disclosed rotational indicator, can be varied over a wide range that is limited only by the double gear reduction ratio and the total number of double gears 104 included in the compound gears. When indicating the total number of rotations of a bounded input shaft via a pointer assembly, it is only necessary to select an axial position of the pinion gear 200 that will cause the pinion shaft 202 to rotate through an angle of less than 360 degrees as the input shaft is rotated between its rotational limits, and then to mark and or otherwise calibrate the pointer assembly accordingly.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. A rotational indicator comprising:
a mechanical reducer, the mechanical reducer comprising:
    first and second fixed shafts, the first and second fixed shafts being parallel and proximate to each other, one of the first and second fixed shafts being configured to accept a mechanical reducer rotational input;
    first and second pluralities of double gears, wherein:
        the first plurality of double gears rotatably surround the first fixed shaft and are arranged in successive axial alignment therewith;
        the second plurality of double gears rotatably surround the second fixed shaft and are arranged in successive axial alignment therewith;
        each of the double gears comprises a larger gear and a smaller gear, the smaller gear being smaller in diameter than the larger gear, wherein the larger gear axially precedes the smaller gear along the first or second fixed shaft, the larger and smaller gears being rotationally coaxial with and fixed to each other;
        all of the larger gears are mutually identical to each other, and all of the smaller gears are mutually identical to each other, a double gear reduction factor being equal to a number of teeth included in each of the larger gears divided by a number of teeth included in each of the smaller gears;
        the larger and smaller gears are configured such that the larger gear of any one of the double gears can be intermeshed with the smaller gear of any of the other double gears when brought into axially aligned proximity thereto; and
        the fixed shafts and double gears are arranged such that except for a last of the double gears, the smaller gear of each of the double gears surrounding the first fixed shaft is intermeshed with the larger gear of a next one of the double gears surrounding the second fixed shaft, and vice versa;

an axially rotatable pinion shaft proximate and axially parallel with the first and second fixed shafts; and a pinion gear rotationally fixed to the pinion shaft, the pinion gear being axially translatable along the pinion shaft such that it can be engaged with any selected one of the larger gears of the double gears; and an indicating mechanism rotationally coupled to the pinion shaft and configured to provide a rotational indication according to a reduction factor applied to a rotational input of the rotational indicator.

2. The rotational indicator of claim 1, wherein all of the double gears are identical to each other.

3. The rotational indicator of claim 1, further comprising tension springs interspersed with the double gears on each of the first and second fixed shafts, the tension springs being configured to maintain axial positions of the double gears surrounding the first and second fixed shafts.

4. The rotational indicator of claim 1, further comprising a detent mechanism configured to apply a retaining force to the pinion gear that tends to maintain an axial positioning of the pinion gear in engagement with any one of the larger gears of the double gears, while allowing the pinion gear to be transitioned between the larger gears of the double gears by application of an axial force to the pinion gear that is sufficient to overcome the retaining force.

5. The rotational indicator of claim 1, wherein the rotational input to the rotational position indicator is rotationally coupled to the rotational input of the mechanical reducer via at least one input gear.

6. The rotational indicator of claim 1, wherein the pinion shaft is rotationally coupled to the indicating mechanism via at least one output gear.

7. The rotational indicator of claim 1, wherein the indicating mechanism comprises a mechanical output configured to provide a visual rotational position indication.

8. The rotational indicator of claim 7, wherein the mechanical output comprises a pointer configured to rotate in synchronization with the pinion shaft.

9. The rotational indicator of claim 8, further comprising a pointer scale proximate the pointer, the pointer scale comprising relatively rotatable indicating plates which, in combination, provide an indication of rotational limits between which the pointer is able to rotate.

10. The rotational indicator of claim 9, further comprising an intermediate plate sandwiched between the indicating plates and configured to limit a range of relative rotational adjustment of the indicating plates.

11. The rotational indicator of claim 1, wherein the indicating mechanism comprises an electronic output configured to provide an electronic rotational position indication, said electronic output comprising a rotary electronic component that is rotationally synchronized with the pinion shaft.

12. The rotational indicator of claim 11, wherein the rotary electronic component is a single turn rotary potentiometer or a single turn variable capacitor.

13. The rotational indicator of claim 1, wherein the rotational position indicator is configured to indicate a relative degree of opening of a rotary valve.

14. A method of providing a rotational indication of less than 360 degrees representing a number of rotations of an input shaft, the method comprising:

providing a rotational indicator according to claim 1;

coupling the input shaft to the rotational input of the rotational indicator;

axially translating the pinion gear along the pinion shaft into engagement with a designated one of the double gears, the designated double gear being selected such that rotation of the rotational input shaft up to a maximum number of rotations will result in a rotation of the indicating mechanism of less than 360 degrees; and calibrating the indicating mechanism of the rotational indicator such that the indicating mechanism is configured to indicate a rotational state of the input shaft.

15. The method of claim 14, wherein the indicating mechanism comprises a dial assembly, and wherein calibrating the indicating mechanism comprises aligning limit indicators of the dial assembly with minimum and maximum directions of the pointer that correspond respectively with zero rotations and with the maximum number of rotations of the input shaft.

16. The method of claim 14, wherein the indicating mechanism comprises a rotatable potentiometer or variable capacitor, and wherein calibrating the indicating mechanism comprises calibrating a conversion of measured resistance or capacitance of the indicating mechanism to indicate the rotational state of the input shaft.

* * * * *